Patented Aug. 23, 1932

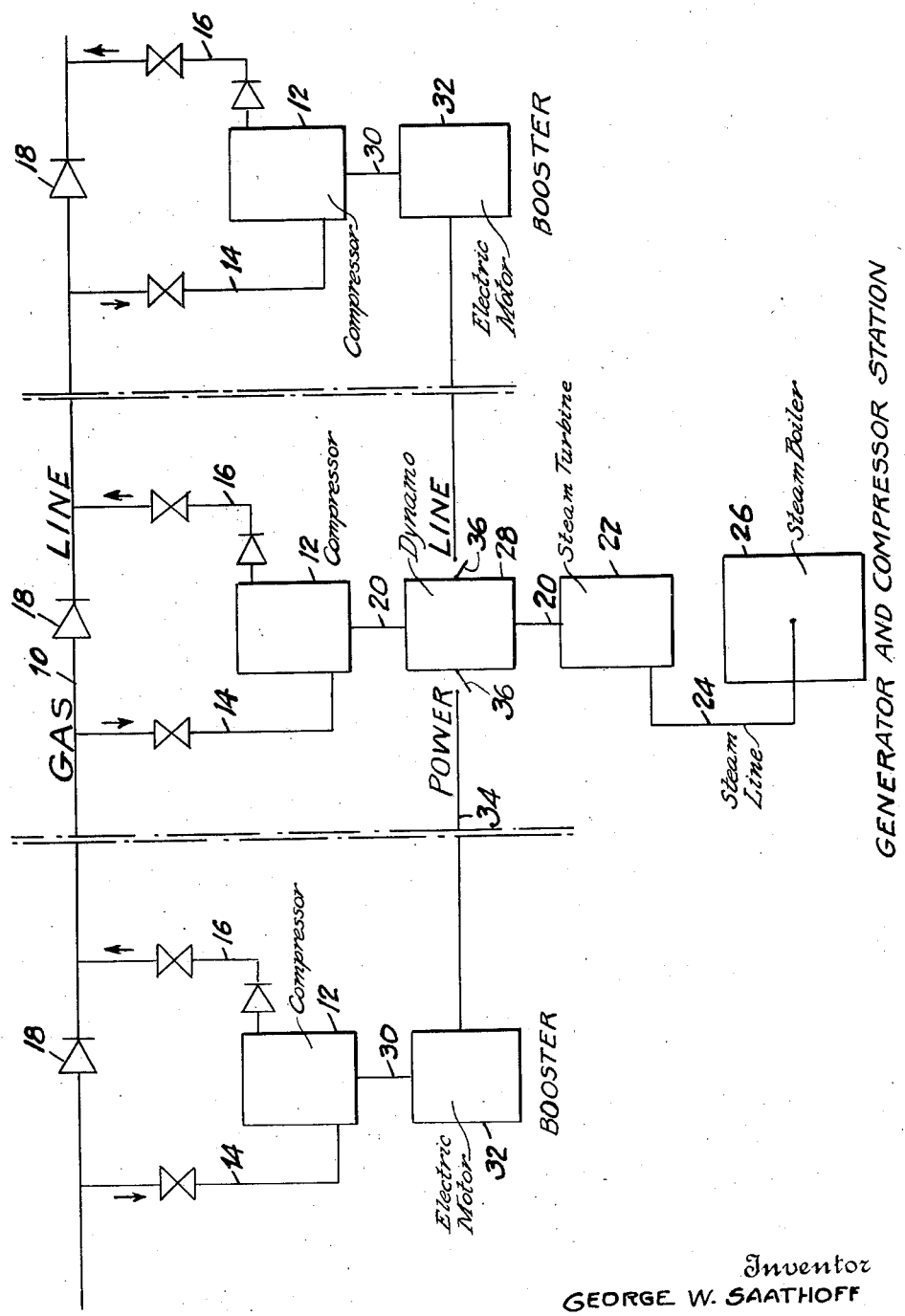

1,873,045

UNITED STATES PATENT OFFICE

GEORGE W. SAATHOFF, OF SOUTH ORANGE, NEW JERSEY, ASSIGNOR TO DOHERTY RESEARCH COMPANY, OF NEW YORK, N. Y., A CORPORATION OF DELAWARE

FLUID TRANSPORTATION SYSTEM

Application filed December 27, 1930. Serial No. 505,197.

This invention relates to long distance fluid pipe line transportation systems, and more particularly to improved method of and means for increasing the flexibility of such systems for efficiently transporting a widely fluctuating volume of fluid.

Artificial and natural gases, crude and refined petroleum oils and other fluids are often transported long distances under pressure through pipe lines from a source of supply to a place of use. The resistance to flow of fluid through pipe lines of any considerable length is of such magnitude, however, that the allowable pressure under which the fluid is introduced into the inlet end of the line is much less than that which would be necessary in order to deliver fluid at a commercially feasible rate from the discharge end of the line. For this reason pressure boosting pump units are connected at spaced intervals along the line to restore the pressure sufficiently to force the fluid at the necessary rate through the succeeding unit length of pipe line to the next booster station.

Pipe lines which are used for transporting fuel gas for domestic and industrial heating purposes necessarily operate under a demand for such fuel which varies widely both with the time of year and with the time of day. The design and arrangement of the pump units which are located at spaced intervals along such pipe lines for restoring the normal pressure losses along the line is not, according to present known practice, sufficiently flexible as to always adequately and economically and efficiently maintain the optimum pressures along the line for supplying the widely fluctuating fluid demand at the discharge end of the line.

To obviate the above indicated difficulties an object of the present invention is to provide an improved flexible design and arrangement of fluid pumping units adapted for unitary controlled operation in efficiently and economically maintaining pressures throughout the length of a long distance fluid pipe line suitable for taking care of the fluctuating demands for fluid over a wider range of demand than can be efficiently handled by any form or arrangement of pumping units now in use.

With this object in view a feature of the invention contemplates a group arrangement of two or more pump or compressor units, preferably of the centrifugal type, in which each unit is provided with a direct coupled variable speed electric motor drive, the units being operatively connected to the fluid pipe line at spaced intervals of for example 25 miles. The motor driving element of each compressor unit is powered by electric energy conveyed over transmission lines supplied by a dynamo located at a central generating station. The speed of each motor, and accordingly the speed of each compressor unit, is varied and controlled in accordance with the frequency of the current furnished from the central generating station dynamo. If one of the compressors goes out of operation the increase in load on the other compressors in order to maintain suitable line pressures is taken care of by increasing the speed of rotation of the dynamo and thus producing a current of higher frequency for driving the motor compressor units. Thus the pumping capacity of the motor compressor units is approximately proportional to the frequency of the central station dynamo. The pumping units are preferably arranged in groups of five located at spaced intervals along the pipe line with the centrally located unit of the group receiving its motivating power directly from a steam turbine at the central generating station, such turbine being also used to drive the dynamo supplying current to the motors of the four auxiliary motor driven compressor units of the group. The compression ratio of a centrifugal compressor varies approximately as the square of the speed. Accordingly with this group arrangement of centrifugal compressor units changes in load on the fluid pipe line can be taken care of either by increasing or decreasing the number of operating compressor units, or by varying the speed of the compressor units by a change in the dynamo frequency, or by a combination of both operations.

With these and other objects and features in view the invention consists in the improved fluid transportation system hereinafter described and more particularly defined in the claims.

The preferred grouping and arrangement of pumping units in accordance with the principle of the present invention, is indicated diagrammatically in the accompanying drawing.

In its simplest aspects the invention consists essentially in an improved fluid transportation system of sufficient flexibility for use in economically and efficiently conveying fluid through a pipe line at an optimum pressure and rate to satisfy a widely varying range of demand.

Referring to the drawing, one section of a fluid pipe line transportation system is shown illustrating an adaptation of a preferred grouping and arrangement of pumping units in accordance with the present invention, to a gas pipe line 10. Assuming, for example, that the drawing illustrates a section of pipe line 10 say 75 miles in length, then it will be noted that the three compressor units 12 are operatively connected to said line at equally spaced distances of say 25 miles. The compressor units 12 are preferably of the centrifugal or rotary type, and each is operatively connected on its inlet side to the pipe line 10 by a valved shunt connection 14 and is operatively connected to the pipe line on its discharge side by a valved shunt connection 16. A bypass and check valve 18 is mounted in the main line intermediate the shunt connections 14 and 16 leading to each of the compressors 12.

The centrally located of the group of three compressors 12 illustrated in the drawing is shown as mounted on a shaft 20 driven by a steam turbine 22. Steam for driving the turbine is conducted to the turbine through a steam line 24 from a boiler plant 26. Also mounted on the drive shaft 20 is an electric current generator or dynamo 28 which generates current having a frequency proportional to the speed of the turbine 22 and of the main centrally located compressor 12. The other two auxiliary compressors 12 are illustrated as mounted on drive shafts 30 driven by electric motors 32. The electric current for driving the motors 32 is conducted over a power transmission line 34 which is supplied by the central generating station dynamo 28. Switches 36 in the transmission line 34 at the dynamo end afford means for controlling the operation of the auxiliary motor-compressor units from the central station.

With load or demand on the line 10 up to say 80% of peak, the auxiliary motor driven booster stations can be cut out and the load can be carried by the main centrally located compressor 12, such main compressor unit having preferably a capacity sufficient to carry the normal load on the line. As the load increases above normal, the motor driven auxiliary booster stations can be cut in until at peak load either one or more of the auxiliary compressors will be operated. Changes in demand for fluid on the pipe line may be met not only by cutting in or out one or more of the booster stations, but also by varying the speed of the operating compressor units. For example, when starting additional compressors it is not necessary with the present grouping to start an additional compressor at full rated speed, thereby increasing the line through-put by a considerable increment. On the contrary, when an additional compressor unit is started, the frequency of the central dynamo can be simultaneously decreased somewhat thereby distributing the load more evenly between the operating booster stations. Any increase in fluid demand can then be met by increasing the frequency of the dynamo and the speed of each compressor unit, thus increasing the through-put capacity of the pipe line in small increments as required to meet the demand.

In case of a failure of a section of the transmission line 34 or one of the auxiliary motor driven compressor stations at the time of full load on the gas line, the distance between operating compressor stations at this point would be doubled. This would result in a decided increase in pressure drop between operating booster stations and hence a lower intake pressure at the next operating station. However, by increasing the frequency of the dynamo and hence the speed of the operating motor driven auxiliary compressors; the compression ratio of the operating compressors can be increased to a point where it will be possible to get back to full line pressure with two of the three booster stations operating. The motors which drive the booster compressor units are variable speed motors in the sense that their speed is correlated with the speed of the generating dynamo and varies directly with changes of frequency of the current generated by the dynamo.

All of the operating compressor units of the group may be motor driven units powered by electrical energy conveyed over a transmission line from a central generating station.

The invention having been thus described, what is claimed as new is:

1. The method of transporting fluids long distances through a pipe line comprising, developing mechanical energy at a centrally located point on said line, utilizing part of the energy thus developed for boosting the pressure of the fluid in said line at said central point, converting another part of the mechanical energy thus developed into electrical energy, reconverting the electric energy into auxiliary mechanical energy, utilizing said auxiliary energy for boosting the pressure of the fluid in said line at a point remote from said central point, and controlling from said central point the pressure boosting operations at all points.

2. In the transportation of fluids through pipe lines the improvement comprising, developing mechanical energy at a centrally located point on said line, utilizing said mechanical energy for boosting the pressure of the fluid in said line sufficiently to take care of the normal fluid demands on said line, and at times of high demand on said line converting a portion of the said energy into electrical energy, reconverting said electrical energy into auxiliary mechanical energy, and utilizing said auxiliary energy for boosting the pressure of the fluid in said line at points remotely spaced from said central point.

3. The method of transporting fluid long distances through a pipe line, comprising developing mechanical energy at a centrally located point on said line, utilizing part of the mechanical energy thus developed for boosting the pressure on said line at said central point, converting another part of the mechanical energy thus developed into electrical energy, reconverting the electrical energy into auxiliary mechanical energy, utilizing said auxiliary energy for boosting the pressure of fluid in the said line at a point remote from said central station, correlating the speed of the application of energy to pressure boosting and the frequency of the developed electrical energy and varying the frequency of the electrical energy proportionately with variations in the fluid demand on said line.

4. In combination with a fluid transportation pipe line, a centrally located power generating element, a main centrifugal compressor unit operatively connected to said line and having a direct drive connection with said generating element, an electric current generating dynamo having a direct drive connection with said generating element, a plurality of auxiliary centrifugal compressor units each operatively connected to said line at points remote from each other and from said main compressor, a variable speed electric motor driving element for each of said auxiliary compressors, and an electric power transmission line connecting said dynamo and each of said motors.

5. In combination with a fluid transportation pipe line, a centrally located power generating element, a main compressor unit operatively connected to said line and powered by said generating element, an electric current generating dynamo driven by said generating element, an auxiliary compressor unit operatively connected to said line at a point remote from said main compressor, a variable speed electric motor driving element for said auxiliary compressor, an electric power transmission line connecting said dynamo and motor, and means whereby the operation of said motor driven compressor unit is controlled from such central station.

6. In combination with a fluid transporting pipe line, three centrifugal compressor units operatively connected to said line at spaced points, a steam generator and turbine having a direct driving connection with one of said compressor units, an electric dynamo having its drive shaft directly coupled with the driving element of said steam turbine, a variable speed electric motor driving element coupled to each of the other auxiliary compressors, and an electric power transmission line connecting said dynamo and each of said motors whereby the speed of each motor driven compressor is synchronized with the speed of the dynamo and varies directly with changes of frequency of the current generated by the dynamo.

7. In combination with a fluid transportation pipe line, a centrally located power generating element and direct coupled main compressor unit operatively connected to said line, an electric current generating dynamo directly coupled with said generating element, two auxiliary compressor units each operatively connected to said line at points remotely spaced respectively from the inlet and discharge sides of said main compressor, a variable speed electric motor driving element directly coupled with each of said auxiliary compressors, an electric power transmission line connecting the said dynamo and each of said motors, and means whereby the operation of each of said motor driven auxiliary compressor units is controlled from said central station.

8. In combination with a fluid transporting pipe line, a centrally located power generating element, a main compressor unit operatively connected to said line and powered by said generating element, an electric current generating dynamo driven by said generating element, an auxiliary compressor unit operatively connected to said line at a point remote from said main compressor, a variable speed electric motor driving element for said auxiliary compressor, and an electric power transmission line operatively connecting said dynamo and motor.

9. In combination with a fluid transportation pipe line, a centrally located power generating unit including as one element an electric current generating dynamo, a plurality of centrifugal compressor units operatively connected to said line at spaced points for boosting line pressures, an electric motor driving element coupled to each of said centrifugal compressors, and an electric power transmission line connecting said dynamo and each of said motors, the speed of each motor being correlated with the speed of the dynamo so as to vary directly with changes of frequency of the current generated by the dynamo.

In testimony whereof I affix my signature.

GEORGE W. SAATHOFF.